United States Patent
Eley

(12) 
(10) Patent No.: US 6,637,454 B1
(45) Date of Patent: Oct. 28, 2003

(54) SWIVEL CONNECTOR FOR A FLUID HANDLING SYSTEM

(76) Inventor: Craig D. Eley, 7640 36th, Lincoln, NE (US) 68516

( * ) Notice: Subject to any disclaimer, the term of this patent is extended or adjusted under 35 U.S.C. 154(b) by 0 days.

(21) Appl. No.: 10/161,232

(22) Filed: May 31, 2002

(51) Int. Cl.[7] .............................................. B65H 75/34
(52) U.S. Cl. ........................... 137/355.26; 137/355.27; 137/580; 137/315.01; 242/407
(58) Field of Search ............................. 137/580, 355.26, 137/355.27, 315.01; 242/407

(56) References Cited

U.S. PATENT DOCUMENTS

| | | | | |
|---|---|---|---|---|
| 4,506,698 A | * | 3/1985 | Garcia et al. | .......... 137/355.26 |
| RE32,510 E | * | 9/1987 | Tisbo et al. | ............ 137/355.27 |
| 5,787,923 A | * | 8/1998 | Shea et al. | ............. 137/355.26 |

* cited by examiner

Primary Examiner—A. Michael Chambers
(74) Attorney, Agent, or Firm—Thomte, Mazour & Niebergall; Shane M. Niebergall

(57) ABSTRACT

A fluid handling system is disclosed having a swivel for connecting a stationary fluid source line to a fluid service line that is wound upon a reel. A rotor cap secures the fluid source line and a rotor within the swivel in position, allowing a housing within the swivel to freely rotate with the fluid service line and reel. The swivel is coupled to the fluid source line using a crimping ferrule to eliminate the necessity of predisposing mating components on the fluid source line. The swivel is further provided with seals that reduce the incidence of bunching and tear due to the reduction in drag imposed on the seals.

22 Claims, 3 Drawing Sheets

SWIVEL CONNECTOR FOR A FLUID HANDLING SYSTEM

BACKGROUND OF THE INVENTION

1. Field of the Invention

The present invention relates to fluid handling systems, and more particularly to a swivel for connecting a fluid source line to a fluid service line in a fluid handling system utilizing a reel to wind the fluid service line.

2. Description of the Prior Art

Reels are commonly used to wind fluid lines, such as hoses, that are used in a number of operations that involve fluid handling. Examples of the type of fluids that may need to be handled include water, lubricants, solvents, coolants, and various gases. The reels used in such operations typically employ the use of a swivel for connecting a fluid supply line to the fluid service line, which is wound around the reel. The swivel allows for the winding and unwinding of the service line not only for ease in using and storing the service line, but also to prevent damage to the same.

Reels are typically supported on axles that further serve as a means to allow the rotation of the reel by the user. While the reel is rotating, the axle is kept in a stationary position. Similarly, the fluid source line, which extends from a fluid source such as water faucet, must be kept in a stationary position to prevent the twisting or damaging of the line. The swivel allows the connection between the stationary fluid source line and the rotating fluid service line. However, current swivel connectors are either a complex assembly of intricate parts, which increase associated costs and maintenance issues, or made from inferior designs that are limited in use and require frequent repair. Accordingly, what is needed is a swivel for use in a fluid handling system that is simple and inexpensive in design but performs reliably in a wide range of applications.

SUMMARY OF THE INVENTION

The swivel connector of the present invention is ideally suited in fluid handling systems that require the reeling and unreeling of fluid lines. The swivel connector is comprised of a rotor that is rotatably connected to a swivel housing. The swivel connection is simply achieved through the use of a bearing disposed between the rotor and the housing.

A pair of O-ring seals are disposed on either side of the bearing to prevent the escape of fluid from the system and the fouling of the bearing ring by dirt or other debris from outside the system. The seals are secured within channels formed in the inner walls of the housing. Accordingly, the inner circumference of the seals creates a sealing surface against the exterior of the rotor. By using the smaller of the two circumferential perimeters, less drag is created during rotation, thus reducing the tendency of the seals to bunch and tear.

The fluid source line can be crimped directly to one end of the rotor through the use of a crimping ferrule secured to one end of the rotor. Accordingly, the need for the assembly and connection of additional mating components to the fluid source line is eliminated. A rotor cap is locked in place over the rotor and crimping ferrule. A snap button secures one end of the rotor cap to the axle of the fluid handling system to prevent rotation of the rotor cap. The opposite end of the rotor cap is provided with an opening which is shaped to conform to the cross-sectional shape of the rotor. Accordingly, while the reel is rotated, the axle, rotor cap, and rotor remain in a fixed position. The housing is adapted to receive a plurality of connection adapters that allow the swivel to be connected to fluid service lines having different diameters and various mating components.

Accordingly, it is one of the principal objects of the present invention to provide a fluid handling system that is simple in construction but effective for use in a wide range of fluid handling applications.

Yet another object of the present invention is to provide a fluid handling system having a swivel connector that can be directly coupled with a fluid source line without the necessity of additional coupling structure being disposed on the fluid source line.

Still another object of the present invention is to provide a fluid handling system having a swivel that substantially prevents the rotation of the fluid source line and the rotor using a simple and reliable design.

Yet another object of the present invention is to provide a fluid handling system having a swivel that is designed to minimize the wear and damage of its seals.

Still another object of the present invention is to provide a fluid handling system having a swivel that is easy to maintain.

These and other objects will be apparent to those skilled in the art.

DESCRIPTION OF THE PREFERRED EMBODIMENT

Figure 1:
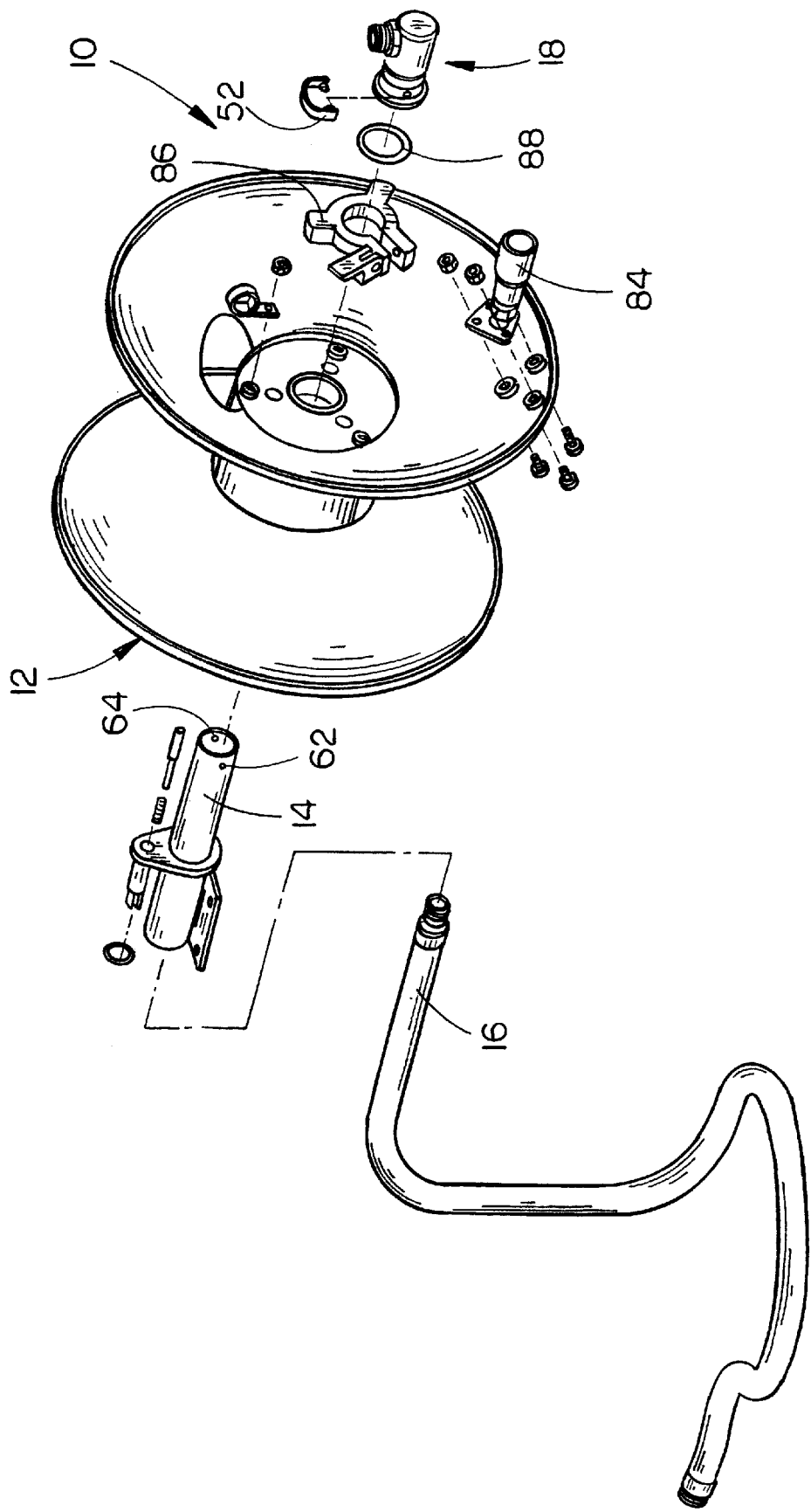
FIG. 1 is an exploded perspective view of the fluid handling system of the present invention.

FIG. 1 depicts the fluid handling system 10 of the present invention, which is preferably comprised of a reel 12, axle 14, fluid source line 16, and a swivel connector 18. Although not depicted, the fluid handling system 10 will be further comprised of a fluid service line that is operatively connected to the swivel connector 18 and wound about the reel 12. It is contemplated that the fluid handling system 10 may be used in a wide range of operations that involve the handling of water, lubricants, adhesives, coolants, solvents, various gases, and other similar fluids. It will be understood by those skilled in the art that as the application of the system is changed for the handling of different fluids, the materials used, such as the nature and grade of fluid lines used, will change accordingly. However, for the purposes of description only, the fluid handling system 10 of the present invention will be described as it would be used for the handling of water in a residential application.

To allow the fluid handling system 10 to wind and unwind its fluid service line, the axle 14 should be typically mounted to a stationary frame (not shown). The frame could be freestanding, mounted to a wall or other structure, or even hand-held. The axle 14 supports the reel 12, which is secured to the axle 14 in a rotatable fashion. In most applications, the axle 14 will be fixed in a stationary position during the rotation of the reel 12.

The fluid source line 16 is preferably disposed through the center of the axle 14 and, thus, extends through the center portion of the reel 12. While it is desirable to allow the fluid service line to rotate with the wheel 12, the fluid source line 16 must remain in a fixed position to prevent the twisting and damaging of the fluid source line 16 or the fluid source to which it is connected. Accordingly, the fluid source line 16 is connected to the swivel 18. The swivel 18 will allow for the stationary placement of the fluid source line 16 while permitting the rotation of the fluid service line to which it is operatively connected.

Figure 2:
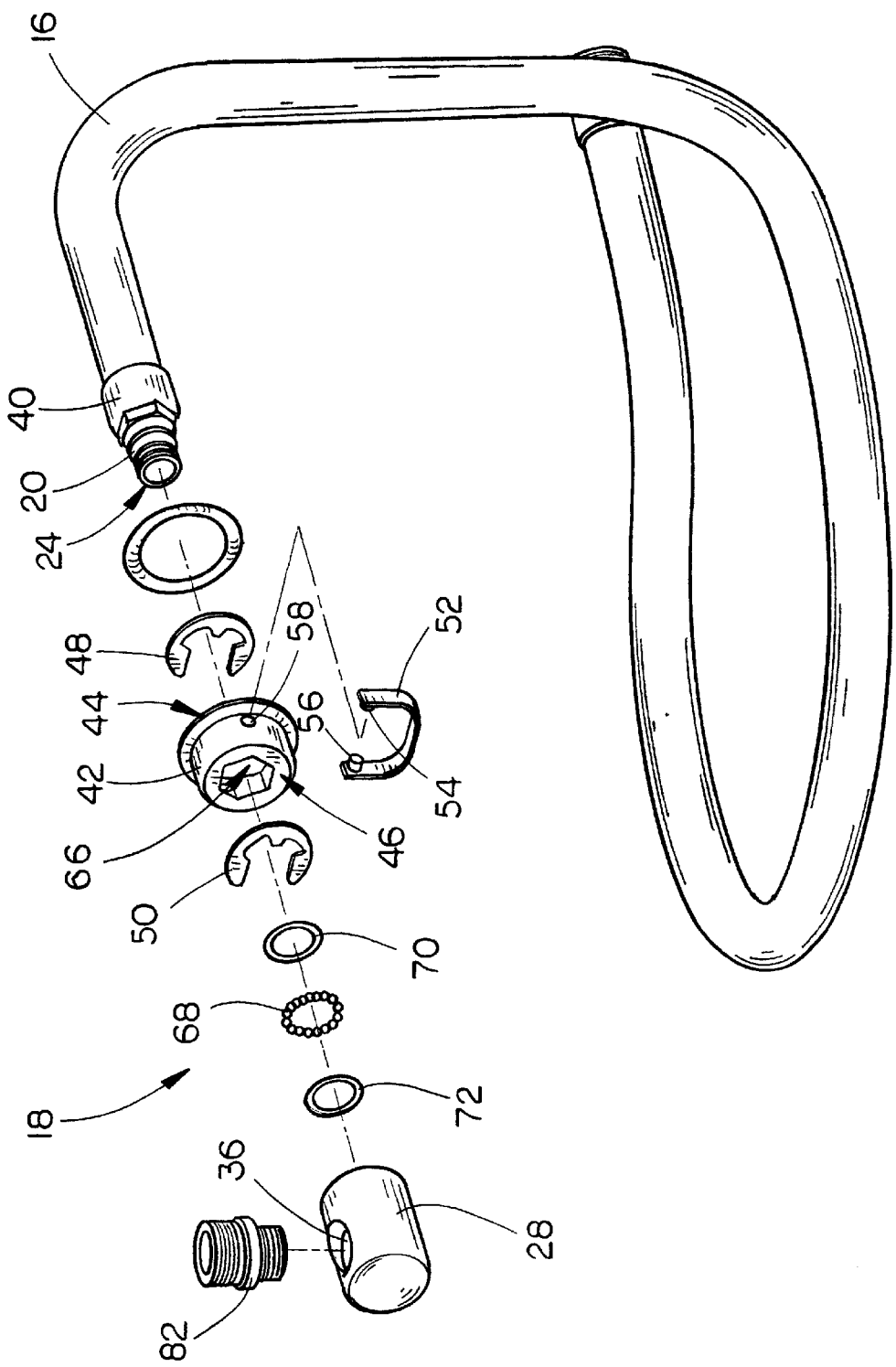
FIG. 2 is an exploded view of the swivel connector of the fluid handling system depicted in FIG. 1 as the same would be coupled to a fluid source line.
Figure 3:
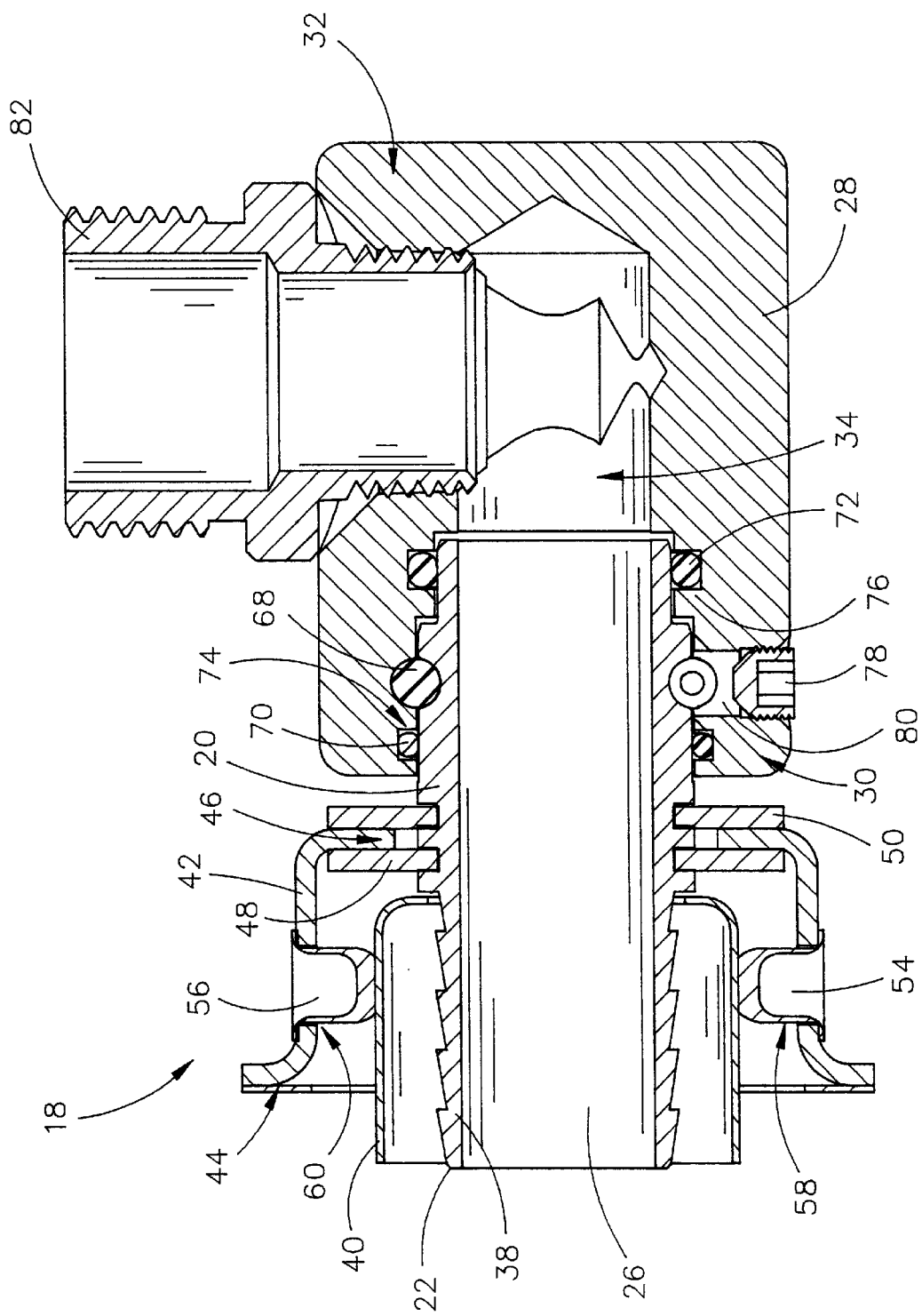
FIG. 3 is a cross-sectional side elevation view of the swivel connector depicted in FIG. 2 in an assembled form.

The swivel 18 is comprised of an elongated rotor 20 having an open first end 22 and an open second end 24. The first end 22 and the second end 24 are in open fluid communication with one another by way of a fluid passageway 26. The second end 24 of the rotor 20 is rotatably connected to a housing 28, having a first end portion 30 and a second end portion 32. The fluid passageway 26 of the rotor 20 is placed in open fluid communication with a fluid passageway 34, which extends between the first end portion 30 and the second end portion 32 of the housing 28. An opening 36 is formed in the housing 28, adjacent the second end portion 32, so that it is in open communication with the fluid passageway 34. While FIG. 2 depicts the opening 36 as being formed in a side portion of the housing 28 to form a 900 swivel, it is contemplated that the opening 36 could be formed in the end portion 32 to provide a single coaxial fluid passageway extending through the rotor 20 and the housing 28.

A mating end of the fluid line 16 is secured to the first end 22 of the rotor 20. To eliminate the necessity of disposing a mating component on the mating end of the fluid source line 16, the rotor 20 is formed to have a ribbed hose connector 38 and crimping ferrule 40 which receive the mating end of the fluid source line 16 therebetween. The crimping ferrule 40 can then be mechanically depressed toward the ribbed hose connector 38 to secure the fluid service line 16 to the rotor 20. It is contemplated, however, that should a particular application require, the fluid source line 16 and the first end 22 of the rotor 20 could be provided with traditional mechanical coupling structures such as the threaded male and female connectors used by the prior art.

The swivel 18 is further preferably provided with a rotor cap 42, having an open first end 44 and an open second end 46. A first locking ring 48 is secured around the rotor 20, intermediate its first and second ends 22 and 24. The rotor 20 is then disposed within the rotor cap 42 until the first locking ring 48 engages the lower surface of the second end portion 46 of the rotor cap. A second locking ring 50 is then disposed around the rotor 20 adjacent the upper surface of the second end portion 46 of the rotor cap 42. The first and second locking rings 48 and 50 substantially prevent the longitudinal movement of the rotor cap 42 along the length of the rotor 20. It is contemplated that the locking rings 48 and 50 could be replaced by similar structures capable of the same function, such as threaded nuts (not shown) or pins (now shown) that would extend radially from the rotor 20.

A snap button 52 is provided with at least one, but preferably two or more, locking pins 54 and 56. The locking pins 54 and 56 are releasably received by openings 58 and 60 disposed within the rotor cap 42, intermediate its first and second end portions 44 and 46. The locking pins 54 and 56 are further releasably received by openings 62 and 64 formed in the axle 14, which is removably received between the rotor cap 42 and the crimping ferrule 40. In this position, the locking pins 54 and 56 secure the swivel 18 to the axle 14 and prevent the rotation of the rotor cap 42. The opening 66 formed in the second end portion 46 of the rotor cap 42 is preferably shaped to conform to the cross-sectional shape of the rotor 20. While an infinite number of specific shapes is contemplated, it is preferred that the shape be that of a polygon. In FIG. 2, the opening 66 has been shaped in the form of a hexagon. By mating the shape of the opening 66 to the cross-sectional shape of the rotor 20, the rotational movement of the rotor 20 and the fluid source line 16 will be substantially prevented.

To facilitate the rotation of the housing 28 with respect to the rotor 20, a plurality of bearings 68 are disposed between the housing 28 and the rotor 20 so that they are placed in sliding contact therewith. While it is contemplated that the bearings 68 could be made from several different materials, such as hardened or stainless steel, it is generally preferred that the bearings 68 be made from a plastic, such as Acetal. The use of the Acetal bearings allows for a higher rate of rotation between the housing 28 and the rotor 20. The Acetal bearings also tend to wear longer than their steel counterparts. A set-screw 78 is preferably disposed within an opening 80 formed in the side of the housing 28 in open communication with the bearings 68. The bearings 68 are easily inserted and removed from their position between the housing 28 and the rotor 20 through opening 80.

A first seal 70 is disposed between the housing 28 and the rotor 20 intermediate the bearings 68 and the first end portion 30 of the housing 28. The first seal 70 serves to prevent dirt or other debris from entering the housing 28 and fouling the bearings 68. Similarly, a seal 72 is disposed between the housing 28 and the rotor 20, on the opposite side of the bearings 68. The seal 72 provides a seal to prevent fluids passing through the fluid passageways 26 and 34 from reaching the bearings 68 or leaking from the first end portion 30 of the housing 28. The seals 70 and 72 are fit within channels 74 and 76 formed in the housing 28. Accordingly, seals 70 and 72 move with the housing 28 as it rotates with respect to the rotor 20. The inner circumference of the seals 70 and 72 establish a seal through their sliding engagement with the rotor 20. By moving the sealing surface from the outer circumference of the seals (as demonstrated in the prior art) to the inner circumference of the seals, the amount of drag exerted on the seals is reduced, thus greatly reducing the tendency of the seals to bunch and tear.

A coupling adapter 82 is removably received by the opening 36 formed in the housing 28. The coupling adapter 82 can be used to adapt the opening 36 to be connected with service lines of various diameters and having various styles of connectors disposed thereon. To better facilitate the operation of the fluid handling system 10, it is preferred that the reel 12 be provided with a handle 84 for manual rotation of the reel 12. It is also preferred that a breaking assembly 86 be disposed between the swivel 18 and the reel 12 around the axle 14. Where a breaking assembly 86 is employed, a spring washer break 88 will preferably be disposed between the breaking assembly 86 and the rotor cap 42.

In the drawings and in the specification, there have been set forth preferred embodiments of the invention; and although specified items are employed, these are used in a generic and descriptive sense only and not for purposes of limitation. Changes in the form and proportion of parts, as well as substitute of equivalents, are contemplated as circumstances may suggest or render expedient without departing from the spirit or scope of the invention as further defined in the following claims.

Thus, it can be seen that the invention accomplishes at least all of its stated objectives.

I claim:

1. A swivel for connecting fluid lines in a fluid handling system, having at least a reel and an axle, comprising:

an elongated rotor having first and second ends; said first end of said rotor being adapted to be operatively connected to a first fluid line in the fluid handling system;

a housing having first and second end portions; said first end portion of said housing being operatively rotatably connected to the second end of said rotor; said second end portion of said housing being adapted to be operatively connected to a second fluid line in the fluid handling system;

a rotor cap having generally open upper and lower ends, and a sidewall portion extending between said upper and lower ends; said lower end of said rotor cap being operatively connected to the axle; said upper end of said rotor cap being operatively connected to said rotor; and at least one locking pin; said at least one locking pin being selectively disposable within at least one opening formed in the side portion of said rotor cap so that said at least one locking pin may be releasably engaged with the axle and substantially prevent the movement of said rotor cap with respect to the axle.

2. The swivel of claim 1 further comprising an opening formed in the upper end of said rotor cap that is shaped to generally conform with at least a portion of a cross-sectional shape of said rotor to substantially prevent the rotation of said rotor with respect to said rotor cap.

3. The swivel of claim 2 wherein the opening in the upper end of said rotor cap is hexagon-shaped.

4. The swivel of claim 1 further comprising at least one locking ring operatively connected to said rotor adjacent the upper end of said rotor cap to substantially prevent the movement of said rotor cap along the length of said rotor.

5. The swivel of claim 1 wherein the lower end of said rotor cap is positioned adjacent the reel to substantially prevent the longitudinal movement of the axle with respect to the reel in at least one direction.

6. The swivel of claim 1 wherein the first end of said rotor is provided with a crimping ferrule to operatively engage an end portion of said first fluid line and secure the first end of said rotor thereto.

7. The swivel of claim 1 further comprising at least one seal disposed between said housing and said rotor intermediate the first end portion of said housing and the second end of said rotor.

8. The swivel of claim 7 wherein said at least one seal is operatively secured to a channel formed in said housing so that said rotor is allowed to rotate with respect to said at least one seal.

9. The swivel of claim 1 further comprising a plurality of bearings disposed between the first end portion of said housing and the second end of said rotor to facilitate rotational movement between said rotor and said housing.

10. The swivel of claim 9 further comprising first and second seals disposed between said housing and said rotor; said first seal being positioned intermediate the second end of said rotor and said at least one bearing; said second seal being positioned intermediate the first end portion of said housing and said at least one bearing.

11. The swivel of claim 10 wherein said first and second seals are operatively secured within channels formed in said housing so that said rotor is allowed to rotate with respect to said first and second seals.

12. The swivel of claim 9 further comprising a set-screw disposed within an opening formed within said housing adjacent the first end portion thereof; said set-screw and opening providing access for insertion and removal of said bearings from the swivel.

13. The swivel of claim 9 wherein said bearings are comprised of a plastic material.

14. The swivel of claim 13 wherein said plastic material is Acetal.

15. The swivel of claim 1 wherein said housing is provided with an opening formed intermediate the first and second end portions thereof; said opening being in open fluid communication with the first end of said rotor.

16. The swivel of claim 15 further comprising an adapter coupling operatively removably connected to the opening in said housing.

17. A fluid handling system, comprising:

a rotatable reel upon which a fluid service line can be wound;

a stationary axle for supporting said rotatable member;

a swivel having at least a rotator and a housing operatively rotatably coupled to one another; said rotator being operatively connected to a fluid source line; said housing being operatively connected to said fluid service line;

a rotor cap having first and second ends operatively removably secured to said axle;
  said rotor being at least partially disposed within said rotor cap and extending at least partially from the second end of said rotor cap;

a securing member having at least one locking pin extending therefrom; said securing member being operatively connected to said rotor cap so that said at least one locking pin extends at least partially through at least one opening formed in said rotor cap and releasably engages said axle to substantially prevent the rotation of said rotor cap with respect to said axle.

18. The fluid handling system of claim 17 further comprising at least one seal disposed between said housing and said rotor; said seal being operatively slidably coupled to said rotor to form a sealing surface between said at least one seal and said rotor.

19. The fluid handling system of claim 17 wherein the shape of the opening formed in the second end of said rotor cap is that of a hexagon.

20. The fluid handling system of claim 17 further comprising means for preventing said rotor cap from moving longitudinally with respect to said rotor.

21. The fluid handling system of claim 17 further comprising means for securing said fluid source line to said rotor.

22. The fluid handling system of claim 17 further comprising means for connecting said housing to a fluid service line.

* * * * *